United States Patent [19]

Sunderland

[11] Patent Number: 4,589,546
[45] Date of Patent: May 20, 1986

[54] FISHING LURE STORAGE AND TRANSPORTATION STRUCTURE

[76] Inventor: Francis S. Sunderland, 2925 Witchwood La., Waukegan, Ill. 60087

[21] Appl. No.: 690,258

[22] Filed: Jan. 10, 1985

[51] Int. Cl.⁴ ..................... A01K 97/00; B65D 55/10
[52] U.S. Cl. ..................... 206/315.11; 206/315.1; 43/57.1; 220/252; 220/337; 220/94 A; 220/DIG. 12; 220/21
[58] Field of Search ............ 206/315.11, 315.1; 220/252, 334, 337, 94 A, 902, DIG. 12, DIG. 14, 22, 21; 43/57.1; 62/371, 372, 457; 70/63

[56] References Cited

U.S. PATENT DOCUMENTS

| | | | |
|---|---|---|---|
| 2,220,817 | 11/1940 | Holmes | 43/57.1 |
| 2,711,050 | 6/1955 | McIntyre | 43/57.1 |
| 2,712,487 | 7/1955 | Miller | 206/229 |
| 2,864,545 | 12/1958 | Royce | 229/42 |
| 3,182,872 | 5/1965 | Brosseav | 43/57.1 |
| 3,350,810 | 11/1967 | Warner et al. | 43/57.1 |
| 4,006,553 | 2/1977 | Porter et al. | 206/315.11 |
| 4,128,170 | 12/1978 | Elliot | 43/57.1 |
| 4,353,182 | 10/1982 | Junkas et al. | 206/315.11 |
| 4,383,385 | 5/1983 | Myers | 43/57.1 |
| 4,491,239 | 1/1985 | Chapman | 220/338 |

OTHER PUBLICATIONS

"Good Life" catalog, 1976 edition, p. 14.

Primary Examiner—William Price
Assistant Examiner—Brenda J. Ehrhardt
Attorney, Agent, or Firm—Wood, Dalton, Phillips, Mason & Rowe

[57] ABSTRACT

A fishing lure storage and transportation structure having a portable container with an interior recess removably mounting a unitary lure storage core. The unitary lure storage core and container are provided with suitable passages and openings for flow of water from within the container to the exterior thereof and which also facilitate drying action of lures suspended within the tubes of the lure storage core by a thermo-siphoning action. The action results from the container having a double wall insulated body with a single panel lid and the lid having openings. The warmest air will be beneath the lid and this creates an airflow through the portable container whereby the air can flow upwardly and outwardly thereof and carry any trapped moisture to the outside of the portable container.

9 Claims, 7 Drawing Figures

FISHING LURE STORAGE AND TRANSPORTATION STRUCTURE

BACKGROUND OF THE INVENTION

This invention pertains to a fishing lure storage and transportation structure having a unique arrangement of elements including a unitary lure storage core removably positioned within a portable container to provide individualized storage for fishing lures and which utilizes two different types of drying systems for drying the lures. In addition to the lures being individually suspended in order to drip dry, there is also a thermosiphoning action whereby air is caused to circulate through the portable container and trapped moisture is vented to the atmosphere.

A commonly-used structure for storing of fishing lures is a tray-style tackle box having a plurality of hinged trays which can be moved to positions outside of the box. The tray-style tackle box is bulky when open, takes up too much boat space, and tends to become top heavy and tip over very easily when in use. Additional problems are the inability of the openings in the trays to hold all of the various sizes and shapes of fishing lures used today as well as the tendency of tackle box structure, such as latches, hinges and handles, to break after a fairly short period of use. The fishing lure collection stored in the tackle box cannot be washed down, which is important after fishing in salt water, and a wet fishing lure can rust, corrode or rot, when stored, because of no air circulation and trapped moisture within the tackle box.

It is also known to use a Styrofoam cooler, which has many of the disadvantages of the tray-style tackle box set forth in the preceding paragraph. The Styrofoam cooler tends to break and is too light in weight to be steady at high boat speeds and when fishing in wind and choppy water. Of major importance is the lack of any air circulation inside the Styrofoam cooler to avoid trapped moisture.

There are other tackle boxes that have been used by fishermen, including the loose positioning of tubes or pipes in a portable container. However, none are known which provide for individualized storage of the fishing lures in a removable unitary lure storage case within a portable container and, more particularly, with provision for washing off the lures and with drying thereof achieved by both a drip dry capability as well as an air circulation drying achieved by an induced air circulation within the container.

A SUMMARY OF THE INVENTION

A primary feature of the invention is to provide a fishing lure storage and transportation structure having means for individually holding fishing lures to permit easy handling thereof as well as a drip dry thereof and with the fishing lures being supported by a unitary lure storage core removably positioned within a portable container and with parts of the lower end of the lure storage core being spaced from the bottom of the portable container carrying the unitary lure storage core to permit water to flow away from the lure storage core and air to flow inwardly thereof.

Another feature of the invention is to provide a fishing lure storage and transportation structure as described in the preceding paragraph wherein the portable container which removably mounts the unitary lure storage core has a body with an internal recess and an insulated double wall construction and a single wall movable lid, the body having openings extending around the bottom perimeter thereof to permit flow of air and water therethrough and the lid having a series of openings for airflow therethrough, whereby the air within the container and beneath the lid can warm more repidly than the air within the container body having the insulated double wall structure to cause an upward airflow through the container and which vents trapped moisture from the portable container.

Other features of the invention are to provide a fishing lure storage and transportation structure in which the unitary lure storage core is formed of a series of plastic tubes which may be either round or rectangular and which are bonded together; the tubes have cut-outs at their lower ends to define notches providing water and airflow passages; the storage capacity can be increased by the use of divider strips positioned in a selected number of the tubes for partitioning of a tube to prevent entanglement of two fishing lures within a tube; leader trays are attached to the upper sides of the lure storage core and have air and water openings; and the structure can readily be made in different sizes to accommodate the particular types of fishing lures being used by selection of the desired size of the basic portable container and suitable selection of tube length and diameter for forming the unitary lure storage core.

An object of the invention is to provide a fishing lure storage and transportation structure having a portable container having a body with an interior recess and a movable lid, a unitary lure storage core having a series of upright tubes positioned within the container, said tubes each being of a diameter to receive a lure extending downwardly therein and held in position by a hook engaging the top edge of a tube, and means for supporting at least part of the lower end of each tube above the bottom of the container body to permit water to flow outwardly of a tube and air to flow inwardly into the lower end of a tube.

Another object of the invention is to provide a structure as defined in the preceding paragraph wherein the container has walls with openings to permit flow of air and water therethrough.

Still another object of the invention is to provide a portable container for storing fishing lures having a container body having an insulated double wall construction providing an interior recess and having an interior bottom wall, a plurality of rows of interconnected upright tubes positioned in said recess and with parts thereof spaced from said interior bottom wall, a series of openings through said double wall at the bottom perimeter of said container body for outward flow of water and inward flow of air, a noninsulated enclosing lid for said container body spaced from the upper ends of said upright tubes, and air circulating openings in said lid whereby air can flow into the container through said series of openings and out of the container through the openings in said lid for drying the fishing lures with the airflow being induced by a thermo-siphon action resulting from the differential temperatures in the container as facilitated by the different insulating properties of the container body and the lid.

An additional object of the invention is to provide a portable container as defined in the preceding paragraph and wherein said upright tubes rest on said interior bottom wall and have their lower ends notched to provide said parts spaced from the interior bottom wall and define water drain passages and air intake passages.

Still another object of the invention is to provide a portable container as defined in the preceding paragraphs wherein said upright tubes are of plastic and are bonded to each other, one or more plastic leader trays are positioned one at each side of said rows of upright tubes and bonded thereto with the leader tray having water drain and air intake holes formed in the bottom thereof, and a plurality of plastic strips of the same length as said upright tubes are positioned within a number of the upright tubes to provide additional storage compartments within a single tube.

A further object of the invention is to provide a fishing lure storage and transportation structure having a lure storage core removably mounted within a portable container and with the lure storage core and portable container being provided with means to achieve an airflow through the portable container and the lure storage core resulting from a thermo-siphoning action whereby air and trapped moisture exit the container to assist in drying of the fishing lures.

DESCRIPTION OF THE PREFERRED EMBODIMENTS

Figure 1:
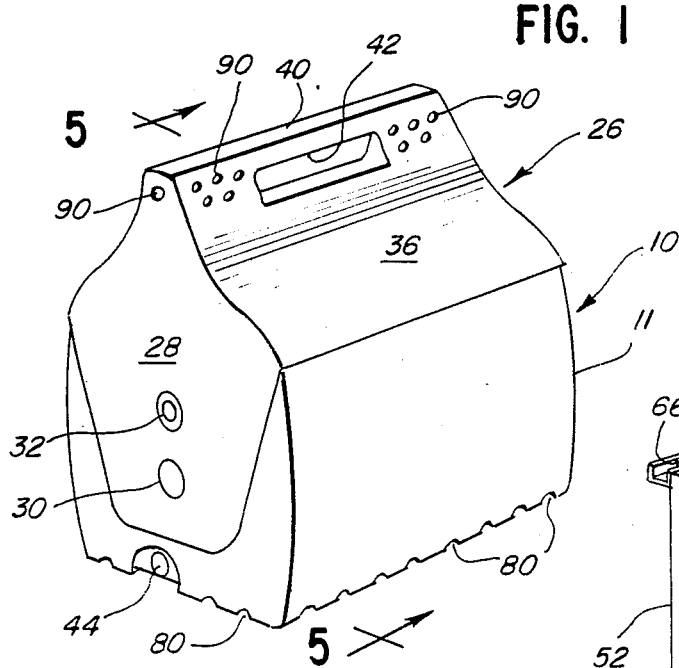
FIG. 1 is a perspective view of the fishing lure storage and transportation structure.
Figure 3:
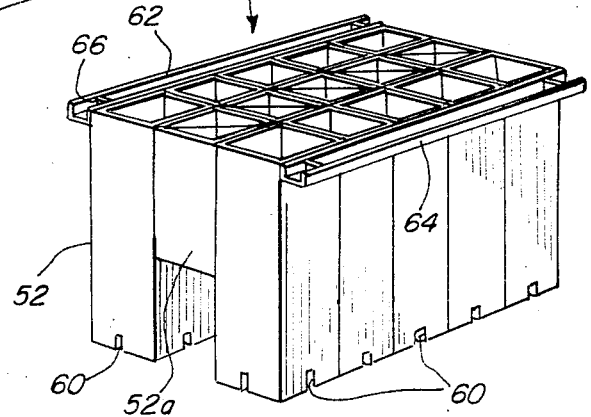
FIG. 3 is a perspective view of the lure storage core seen in FIG. 2 and removed from the portable container.
Figure 2:
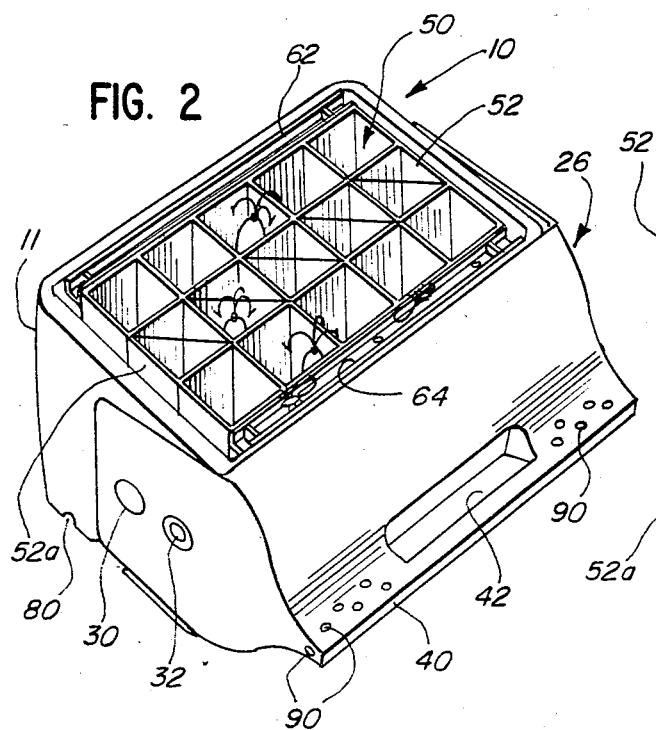
FIG. 2 is a view, similar to FIG. 1, with the lid moved to an open position to show the interior structure.
Figure 4:
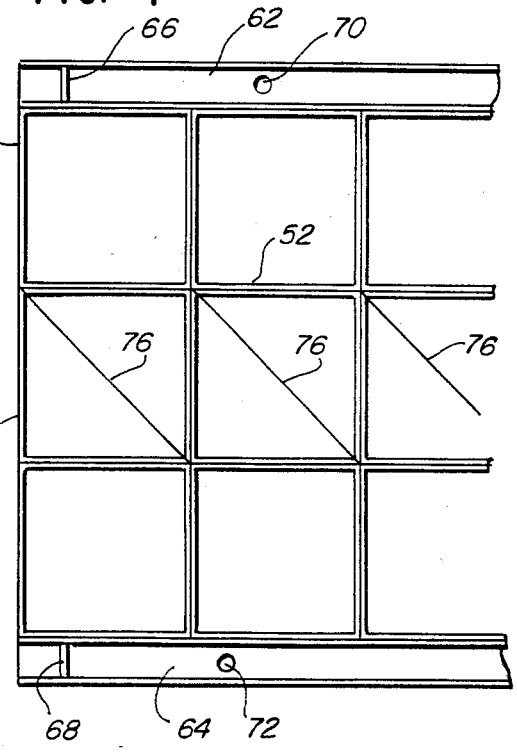
FIG. 4 is a plan view of the lure storage core shown in FIG. 3 and on an enlarged scale.
Figure 5:
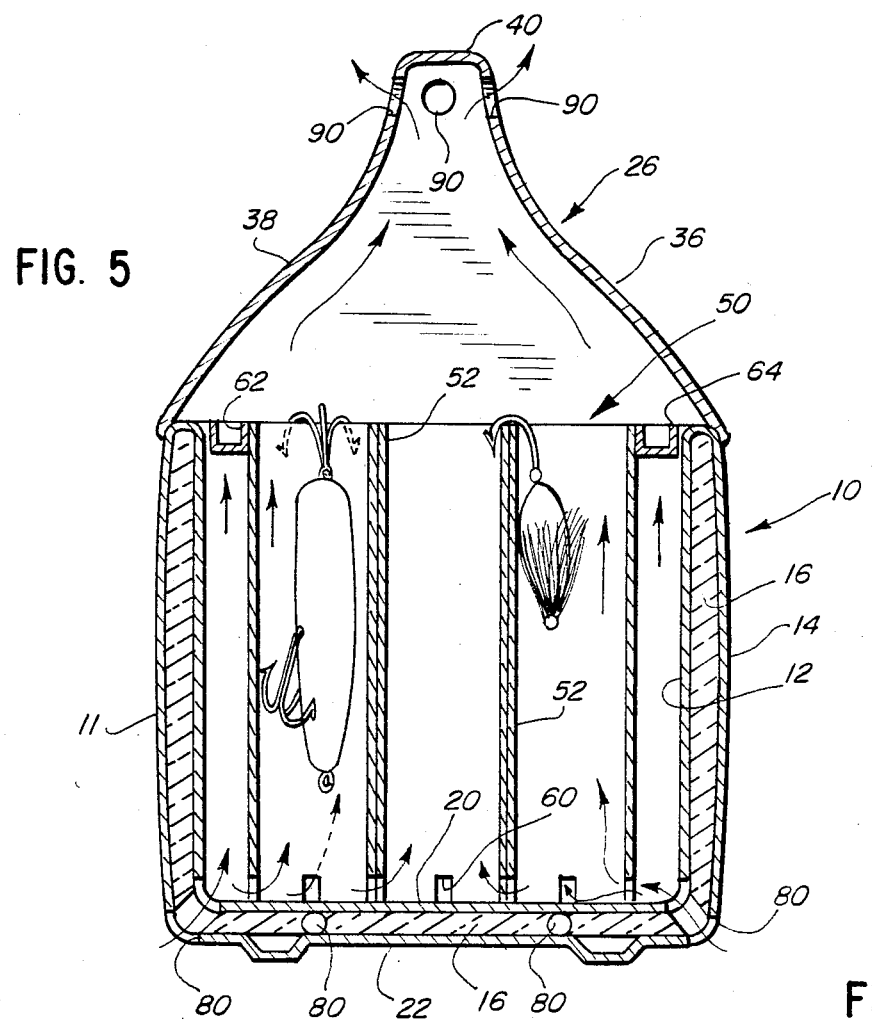
FIG. 5 is a transverse sectional view, taken generally along the line 5—5 in FIG. 1 and on an enlarged scale.

The fishing lure storage and transportation structure is shown generally in FIGS. 1, 2 and 5. A portable container, indicated generally at 10, has a body 11 of a double-walled, insulated construction with an internal perimetral wall 12 spaced from an outer perimetral wall 14 and with insulation material 16 in the space therebetween. The container body 11 has an interior recess within the inner perimetral wall 12 and defined by an inner bottom wall 20 formed integrally with the inner perimetral wall 12. An outer bottom wall 22 is spaced from the inner bottom wall 20 and there is insulating material 16 therebetween. An upwardly tapering movable lid, indicated generally at 26, has depending end panels, one of which is shown at 28 and which are pivoted to the container body with one of the pivots being shown at 30. A latch, in the form of a depressable button 32, coacts between the lid 26 and the body 11 to lock the lid in closed position.

The cross-sectional shape of the lid 26 is more particularly shown in FIG. 5 and has front and rear panels 36 and 38 which extend upwardly to a top section 40 with a recess 42 providing a handle for carrying the portable container. The container body 11 has a drain opening closed by a plug 44.

The portable container 10, as thus far described, is a commercially-available portable insulated container with the container body being of a double wall insulated structure and the lid 26 being a single panel construction and being formed of molded plastic.

A unitary lure storage core, indicated generally at 50, is removably mounted in the container body 11 for upright support of fishing lures and has provision for storage of leaders. The lure storage core 50, shown in the embodiment of FIGS. 1-5, is formed of a series of tubes 52 which are rectangular in cross section and which are disposed vertically and connected to each other. In a preferred embodiment, the tubes 52 are formed of a rigid plastic material and can be bonded to adjacent tubes by a suitable bonding agent for the plastic material. All of the tubes 52 are of the same length, except for a tube 52a which is of a shortened length in order to permit positioning of the lure storage core 50 within the container body without interfering with an interior shape in the container body associated with the drain opening closed by the plug 44. In the embodiment shown, there are three rows of the tubes 52 with the size and total number thereof being chosen whereby, with the leader trays attached thereto, the lure storage core has a relatively snug fit in the interior recess of the container body 11. The lure storage core is, at least in part, supported above the interior bottom wall 20 of the container, whereby water dripping from the fishing lures can reach the interior bottom wall of the container for removal from the container body 11. This spacing is achieved by a cut-out at the bottom of each tube wall providing a notch for flow of water. Each of the tubes 52 has its four walls notched at the bottom thereof with the cut-outs being identified at 60. These cut-outs provide an additional function to be described.

The lure storage core 50 has a pair of leader trays shown at 62 and 64 which are formed of U-shaped plastic material which can be bonded to the adjacent tube walls. The leader trays 62 and 64 have an end wall at each end for confinement of leaders, with a pair of the end walls being seen at 66 and 68 in FIG. 4. Additionally, each of the leader trays 62 and 64 has a series of holes 70 and 72 to permit flow of water therethrough and to additionally provide for air circulation to be described.

As seen in FIG. 2, fishing lures can be separately positioned, one within a single tube 52 of the lure storage core with the fishing lure hanging downwardly and held by a hook engaging over an upper edge of the tube. This permits easy handling of a fishing lure without entanglement with other lures and facilitates drip drying thereof. If the fishing lure is of a size to not require a major part of the space within a tube, a tube space can be segmented by the use of divider strips with a series of these strips, identified at 76, being formed of suitable plastic and extending diagonally one across a tube to divide a tube into two storage spaces. A fishing lure suspended from one of these divider strips is shown in FIG. 2.

With the structure as described, it will be evident that a substantial number of fishing lures can be easily handled and stored without entanglement by being suspended within the tubes and with there being a good drying action because of the drip drying capability and with the water being free to exit the lower ends of the tubes through the cut-outs 60. Additionally, the lures can be washed easily, with the wash water reaching the bottom of the container body. A series of openings 80 extend through the inner perimetral wall 12, the outer perimetral wall 14 and the insulation 16 around the bottom perimeter of the container body whereby water can drain from the container.

From the foregoing, it will be evident that a new and improved structure for storing fishing lures has been provided, with improved storage and drying capability.

A further feature of the storage system is the thermo-siphoning drying action whereby air, as shown by the arrows, may enter through the bottom perimetral openings 80 of the container body into the interior recess, then flow to the interior of the lure storage core tubes 52 through the cut-outs 60, and also flow upwardly through the openings 70,72 in the leader trays 62 and 64 for increased drying action. The thermo-siphoning action is caused by differential temperature of the air within the container because of the air within the double wall insulated container body 11 being cooler than the air beneath the uninsulated lid 26. As a result, the warmer air beneath the lid induces an airflow with air flowing out through a series of openings 90 in the front and rear panels 36 and 38 of the lid and with there also being an opening 90 in each of the end panels of the lid. Dry air flows into the container body through the openings 80.

The thermo-siphoning action is clearly illustrated in FIG. 5 wherein air is shown by arrows as entering through the openings 80 into the interior recess of the container body 11, flowing upwardly toward the leader trays and also into the interior of the lure storage core tubes 52, flowing upwardly to the space within the lid and outwardly of the openings 90 to the atmosphere. This flow of air carries trapped moisture from the closed portable container to enhance the drying of the lures. This drying action is enhanced when the closed portable container is placed in direct sunlight or in any warm space.

The fishing lure storage and transportation structure described in FIGS. 1 to 5, provides a tough durable unit with protection of lures from common rodents and weather elements. Each lure is stored individually to avoid tangling between lures, with there being instant visibility and accessibility and with increased storage capacity provided by the use of the space divider strips. The lures are supported to facilitate drip drying and the structure providing for the thermo-siphoning action achieves proper air circulation and drying to avoid trapped moisture which would contribute to eventual ruin of a good lure by rusting, corrosion and/or rot.

Figure 6:
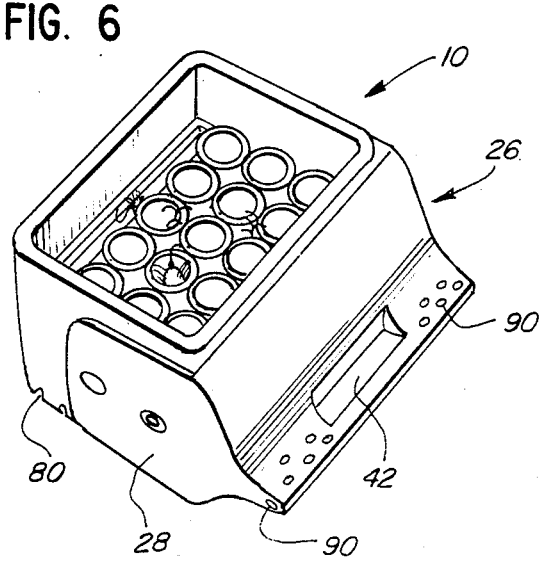
FIG. 6 is a view similar to FIG. 2 of an alternate embodiment of the invention.
Figure 7:
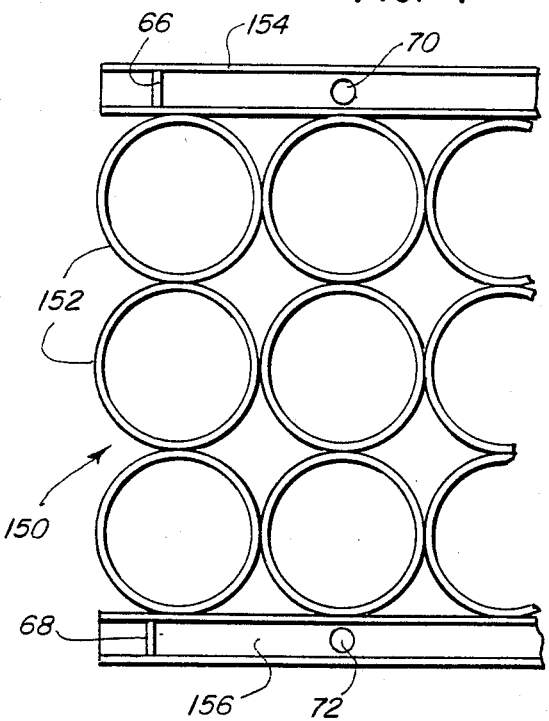
FIG. 7 is a fragmentary plan view of the lure storage core shown in FIG. 6.

A second embodiment of the invention is shown in FIGS. 6 and 7 and differs primarily in size from the first embodiment for storage of smaller size fishing lures. This embodiment has a portable container 10 of the same construction as that described in the embodiment of FIGS. 1 to 5, with a unitary lure storage core 150 generally the same as the unitary lure storage core 50 but differing in size and in the use of shorter tubes 152 which are cylindrical. These tubes are of plastic and are bonded together and a pair of leader trays 154 and 156 extend alongside the lure storage core and are bonded thereto with these leader trays being of the same construction as the leader trays 62 and 64. The portable container 10 is of smaller over-all dimensions than the portable container 10 shown in FIG. 1 whereby the lure storage core 150 having smaller over-all dimensions will comfortably fit within the interior of the portable container for support of fishing lures, as seen in FIG. 6. Apart from the dimensions and the shape of the tubes 152, the embodiment of FIGS. 6 and 7 is the same as that in FIGS. 1-5 whereby all the advantages achieved thereby are also achieved in the smaller storage and transportation structure.

From the foregoing, it will be evident that the principles of the invention can be practiced in a fishing lure storage and transportation structure of whatever size is desired and required to meet the storage requirements.

I claim:

1. A portable container for storing fishing lures comprising, a container body having an insulated double wall construction providing an interior recess and having an interior bottom wall, a plurality of rows of interconnected upright tubes positioned in said recess and with parts thereof spaced from said interior bottom wall, a series of openings through said double wall at the bottom perimeter of said container body for outward flow of water and inward flow of air, a noninsulated enclosing lid for said container body which is upwardly tapered to provide a space above the upper ends of said upright tubes, and air-circulating openings in said lid generally at the top of said space whereby air can flow into the container through said series of openings and out of the container through the openings in said lid for drying the fishing lures with the airflow being induced by a thermo-siphon action with the hottest air in the uninsulated space beneath the lid and the coolest air entering said series of openings and with the air remaining relatively cool in the container body because of the insulated double wall construction but gradually rising in temperature as the air flows upwardly to result in differential temperatures in the container with a relatively cool environment for fishing lures in the tubes within the container body.

2. A portable container as defined in claim 1 wherein said upright tubes rest on said interior bottom wall and have their lower ends notched to provide said parts spaced from the interior bottom wall and define water drain passages and air intake passages.

3. A portable container as defined in claim 2 wherein said enclosing lid is pivotally connected to said container body, and a latch for holding said lid in closed position.

4. A portable container as defined in claim 3 wherein said upright tubes are of plastic and are bonded to each other.

5. A portable container as defined in claim 4 wherein there are a pair of plastic leader trays positioned one at each side of said rows of upright tubes and bonded thereto, and water drain and air intake holes formed in the bottom of said plastic leader trays.

6. A portable container as defined in claim 5 wherein said enclosing lid is shaped to provide an air chamber above said upright tubes.

7. A portable container as defined in claim 6 including a plurality of plastic strips of the same length as said upright tubes for use therein as space dividers.

8. A fishing lure storage and transportation structure comprising, a container body having an insulated double wall construction providing an interior recess and having an interior bottom wall, a series of water drain and air circulating openings through said double wall at the bottom perimeter of the container body, a lure storage core comprising, a plurality of rows of upright plastic tubes bonded together and resting on said interior bottom wall and at least one plastic leader tray bonded to one side of said rows of upright plastic tubes at the upper ends thereof, each of said tubes having cut-outs at the lower end to provide water drain and air circulating passages, said leader tray having water drain and air circulating holes and an upwardly tapering enclosing lid pivoted to said container body and having air-circulating openings, said lid being of an uninsulated single wall construction whereby air beneath the lid will be warmer than air entering at the bottom perimeter of the container to cause a thermo-siphoning action whereby cool air is drawn into the tubes through said cut-outs and air and trapped moisture exit the container through the air circulating openings in the lid.

9. A fishing lure storage and transportation structure as defined in claim 8 wherein said upright tubes are of a size to hold more than one lure and a removable divider strip for positioning lengthwise of an upright tube for partitioning thereof.

* * * * *